US008250166B1

(12) United States Patent
Barnes

(10) Patent No.: US 8,250,166 B1
(45) Date of Patent: *Aug. 21, 2012

(54) SYSTEM AND METHOD FOR SOFTWARE FAILOVER ON A BLADED SYSTEM

(75) Inventor: James D. Barnes, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/501,198

(22) Filed: Jul. 10, 2009

Related U.S. Application Data

(63) Continuation of application No. 10/952,405, filed on Sep. 28, 2004, now Pat. No. 7,590,727.

(51) Int. Cl.
*G06F 15/16* (2006.01)
(52) U.S. Cl. ............ 709/213; 709/226; 714/25; 714/28; 714/32; 714/11
(58) Field of Classification Search .......... 709/208, 709/212, 216, 213, 226; 714/2, 4, 11, 25, 714/28, 32; 370/477, 229
See application file for complete search history.

(56) References Cited

U.S. PATENT DOCUMENTS

| | | | |
|---|---|---|---|
| 6,865,157 B1* | 3/2005 | Scott et al. | 370/242 |
| 7,590,727 B1 | 9/2009 | Barnes | |
| 2004/0078711 A1 | 4/2004 | King et al. | |
| 2004/0109406 A1 | 6/2004 | Rothman et al. | |
| 2004/0111559 A1 | 6/2004 | Heil | |
| 2005/0257213 A1 | 11/2005 | Chu et al. | |
| 2006/0002427 A1* | 1/2006 | MacInnis et al. | 370/477 |
| 2007/0067263 A1* | 3/2007 | Husain et al. | 707/2 |
| 2007/0067435 A1* | 3/2007 | Landis et al. | 709/224 |
| 2007/0168476 A1* | 7/2007 | Davies et al. | 709/220 |

OTHER PUBLICATIONS

Office Action dated Nov. 23, 2007, U.S. Appl. No. 10/952,405, filed Sep. 28, 2004, 11 pages.
Final Office Action dated Jun. 20, 2008, U.S. Appl. No. 10/952,405, filed Sep. 28, 2004, 10 pages.
Advisory Action dated Sep. 12, 2008, U.S. Appl. No. 10/952,405, filed Sep. 28, 2004, 3 pages.
Notice of Allowance dated May 12, 2009, U.S. Appl. No. 10/952,405, filed Sep. 28, 2004, 11 pages.
Supplemental Notice of Allowance dated Jul. 9, 2009, U.S. Appl. No. 10/952,405, filed Sep. 28, 2004, 4 pages.
Egenera™, "Advantages of Running Oracle®9i Database with Real Application Clusters on the Egenera™ BladeFrame®," White Paper, 2002, 6 pgs.
Egenera™, "BladeFrame®: Utility Computing through Datacenter Virtualization," 2001, 12 pgs.

(Continued)

*Primary Examiner* — Djenane Bayard

(57) ABSTRACT

A system for managing software failover on a bladed server is provided. The system includes a plurality of bladed servers, including a first bladed server and a second failover bladed server. The system includes a server control, a storage device, and software. The server control is in communication with the plurality of bladed servers, and the storage device is accessible by the plurality of bladed servers. The software is stored on the storage device. The system also includes a management component that is operable on the server control. The management component monitors execution of the software on the first bladed server. The management component is operable in response to detecting failure of the software on the first bladed server to promote execution of the software from the external storage device by the second failover bladed server. A method for automated software failover is also provided.

21 Claims, 2 Drawing Sheets

OTHER PUBLICATIONS

Egenera™, "Emerging Server Architectures," White Paper, 2001, 13 pgs.

Egenera™, "Improving Datacenter Performance," White Paper, 2001, 19 pgs.

Egenera™, "The Egenera™ Processing Area Network (PAN) Architecture," White Paper, 2002, 21 pgs.

"Egenera, Inc. Announces Commercial Availability of BladeFrame Release 1.1," Supercomputing Online.com, http://supercomputingonline.com/print.php?sid=702, Sep. 24, 2004, 5 pgs.

Gartner, Inc., "Egenera BladeFrame System," Product Report, Apr. 1, 2004, 10 pgs.

Intel, Corp., Egenera, "Modular Computing: The New Model Enterprise Computing Model," White Paper, Cross Industry, 2003, 13 pgs.

Sybase, "Adaptive Server Enterprise on Egenera BladeFrame Platform," White Paper, Jan. 2003, 10 pgs.

* cited by examiner

SYSTEM AND METHOD FOR SOFTWARE FAILOVER ON A BLADED SYSTEM

CROSS-REFERENCE TO RELATED APPLICATIONS

This application is a continuation of and claims priority to U.S. patent application Ser. No. 10/952,405, entitled "System and Method for Software Failover on a Bladed System", filed on Sep. 28, 2004, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to virtualization and network server technology. More specifically, but not by way of limitation, a method and a system are provided that permit more effective resource utilization of bladed network servers.

BACKGROUND OF THE INVENTION

Information technology ("IT") managers face a number of challenges as they are increasingly pushed to improve service delivery while lowering operational costs. These challenges include decreasing "server sprawl", improving system utilization, reducing system management complexity, and improving the flexibility of IT resources. To address these challenges, many IT organizations are implementing some form of server consolidation using bladed servers.

Bladed systems are those in which individual servers are implemented as removable rack-mounted blades. In general, a bladed system includes some combination of the following features: hot insertion and removal of blades, consolidation of cables, integrated system management software, and automated software deployment. Currently available blades may include one to four central processing units ("CPUs") and a typical bladed server may hold in the range of 48 to 250 CPUs.

A processing area network ("PAN") architecture, as exemplified by the bladed systems available from Egenera, Inc., is one approach used to design and implement bladed servers. A PAN architecture includes the components required to implement multiple servers on a single bladed system, i.e., the hardware, software, and network and I/O resources. Specifically, a PAN architecture may include processing resources, integrated networking, centrally managed network and storage resources, management software, and operating system software. This architecture provides for high availability clustering with such features as load balancing and automatic hardware failover.

Bladed systems comprising a PAN architecture also include functionality supporting automatic failover of software or applications. Application failover in this context requires a redundant, passive failover blade and the installation of the application software, operating system, and all required support software on at least two disks—one active and one passive. The dedicated, i.e., passive, boot disk is required to have the same configuration as the primary, i.e., active, boot disk. That is, the failover boot disk must have the identical version of the application installed along with the same operating system, support software, etc. In addition, a third disk is required to store any application data that persists between executions of the application. This failover implementation also requires three internet protocol ("IP") addresses, one for the primary blade, one for the failover blade, and a floating IP address that moves with the application. The PAN management software monitors the application as it executes on the active blade. If that application fails, the PAN management software activates the application on the passive blade using the passive disk.

While this approach to application failover provides for high availability of critical applications, it increases overall system cost and contributes to under-utilization of system resources. Multiple licenses for the application and any required support software must be purchased. Additional maintenance time is required as each time a new patch release, service pack, upgrade, etc. is installed on the primary boot disk, it must also be installed on the failover boot disk. In addition, a redundant, passive blade server and a disk must be dedicated to each application configured for automatic failover and multiple IP resource addresses must be administered.

SUMMARY OF THE INVENTION

In one embodiment, a system for managing software failover on a bladed system is provided. The system includes a plurality of bladed servers, including a first bladed server and a second failover bladed server. The system includes a server control, a storage device, and software. The server control is in communication with the plurality of bladed servers, and the storage device is accessible by the plurality of bladed servers. The software is stored on the storage device. The system also includes a management component that is operable on the server control. The management component monitors execution of the software on the first bladed server. The management component is operable in response to detecting failure of the software on the first bladed server to promote execution of the software from the external storage device by the second failover bladed server.

In another embodiment, a method for automated application failover on a bladed server is provided. The method includes providing a plurality of bladed servers, and storing an application on a storage device accessible by at least some of the plurality of blades. The method includes executing the application on a first bladed server of the bladed server from the storage device. The method provides for monitoring the application during execution, and detecting failure of the application. The method also includes executing the application on a failover bladed server from the storage device.

In another embodiment, a system is provided that includes a plurality of bladed servers, and a storage device that is sharable by the plurality of bladed servers. The system includes software that is stored on the storage device, and a component that is operable to monitor execution of the software on a first bladed server of the plurality of bladed servers. The component is also operable in response to detecting failure of the software on the first bladed server to promote execution of the software from the storage device by a second bladed server of the plurality of bladed servers.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the present disclosure provide a system and method for improving application failover on a bladed server. More specifically, a bladed server with a PAN architecture is provided that includes the ability to perform application failover without requiring additional application licenses, disks, and IP addresses. According to one embodiment, the bladed server is diskless and stateless. The terms "application" and/or "software" as used herein includes, but is not limited to, any software, application, operating system or other computer program(s) or instructions, or combinations thereof. For example, monitoring an application or software for failure may include monitoring one or more computer programs, the operating system whereon the user computer program(s) operate, or both.

Figure 1:
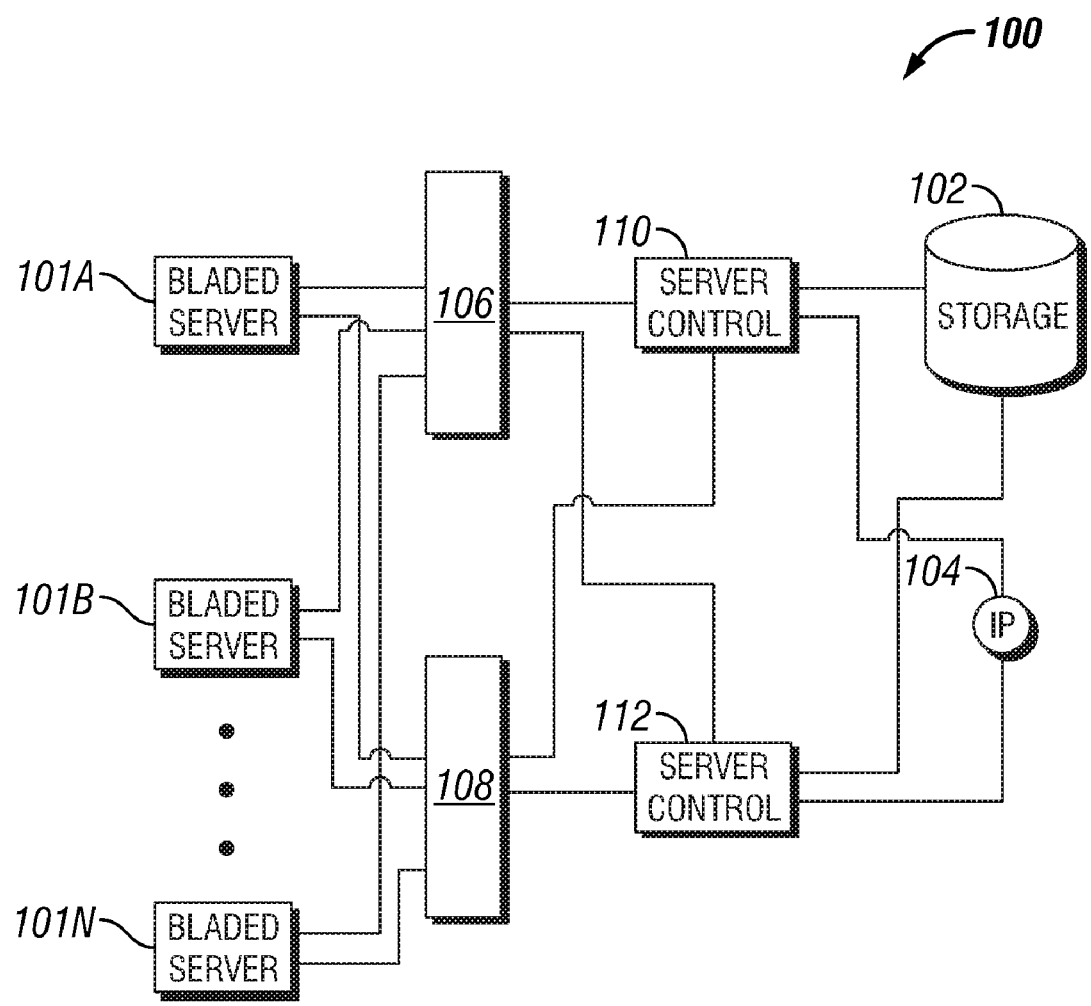
FIG. 1 shows a bladed system with multiple bladed servers according to one embodiment of the present disclosure.

FIG. 1 shows a bladed system 100 which may be configured in a PAN architecture in accordance with one embodiment. Embodiments of the bladed system 100 may be comprised of the Egenera® BladeFrame® or the Egenera® BladeFrame® ES available from Egenera, Inc. Egenera and BladeFrame are registered trademarks of Egenera, Inc. Elements of this disclosure may include features and functionality of these bladed systems or servers, additional descriptions of which may be found in Egenera's White Papers entitled "Improving Datacenter Performance" and "The Egenera Processing Area Network (PAN) Architecture" available at www.egenera.com.

The bladed system 100 comprises multiple bladed servers 101a-101n in a redundant network using an integrated high-speed switch (not shown) connected to external storage 102 and a network 104 through redundant interconnections 106 and 108. The external storage 102 may be implemented as a storage area network ("SAN"), network-attached storage ("NAS"), or a combination of the two. The hardware components of the PAN bladed system 100 may be housed in a chassis (not shown) that provides the infrastructure for administrators to configure and run the bladed servers 101a-101n, 110, and 112. This chassis contains a backplane (not shown) that provides the physical connectivity for the I/O among the bladed servers 101a-101n and for network communication. The backplane includes two redundant serial buses. These serial buses connect the bladed servers 101a-101n, 110, and 112 and provide the physical internal network of the bladed system 100. The two switched-fabric interconnects 106 and 108 provide secure, point-to-point data transfer between the bladed servers 101a-101n, 110, and 112.

The two server controls 110 and 112 perform all actual I/O for the bladed system 100. Each server control 110 and 112 is connected by two host bus adapters to the storage area network 102 that contains all disk partitions available to the bladed system 100, and by two network interface cards to the external network 104. The server controls 110 and 112 include functionality to perform the switching of both external and internal network traffic and to support the dynamic creation of connections between the bladed servers 101a-101n. The server controls 110 and 112 may also include a DVD drive, a local hard disk drive, a serial port, and an Ethernet port.

During normal execution, the server controls 110 and 112 share the processing of external traffic with one handling inbound traffic and the other handling outbound traffic—allowing the bladed system 100 to use the processing power of both simultaneously. However, the functionality of the two server controls 110 and 112 is completely redundant, allowing the bladed system 100 to continue operation on a single server control if one should fail. The server controls 110 and 112 may also execute PAN management software and contain functionality to continuously monitor system health at both the hardware and application levels, and initiate hardware or application failover when needed.

In an embodiment, two redundant switching blades (not shown) are included in the bladed system 100 to provide the physical switching layer of the point-to-point architecture of the bladed system 100 for both internal and external I/O and network traffic rather than housing this functionality in the server controls 110 and 112. The bladed servers 101a-101n and the server controls 110 and 112 each include two redundant switching blade host adapters for connecting to the switching blades and individually connect to each switching blade via the backplane. If a host adapter or switching blade fails and a bladed server loses its connectivity to a specific switching blade, that bladed server sends all network and I/O traffic to the other switching blade. The drivers in the switching blades may conform to the Virtual Interface Architecture (VIA) industry standard. The switching blades are implemented with a shared memory architecture that permits dynamic routing and non-blocking performance and include functionality for load balancing incoming and outgoing I/O and network traffic.

The bladed servers 101a-101n operate as conventional servers once they are configured with virtual links to external storage 102 and the network 104. The bladed servers 101a-101n contain one or more processors, memory, and two network connections, one to each of the server controls 110 and 112. The operating system on each bladed server 101a-101n simulates the availability of hardware such as disk drives and Ethernet cards by interfacing with the I/O server functionality provided on the two server controls 110 and 112.

The bladed system 100 includes PAN management software that executes on the server controls 110 and 112. The PAN management software includes functionality allowing an administrator to create virtual servers that comprise all the functionality of conventional servers. To create a virtual server, an administrator defines the processing capacity for an application, and then associates that capacity with storage available in the external storage 102 and with network resources 104. The PAN management software also includes functionality permitting an administrator to remotely monitor and control virtual servers using either a command line interface or a browser-based graphical user interface.

The PAN bladed system 100 includes a virtual I/O feature that provides all I/O for data storage in the external storage 102, network accesses, and inter-node access for the bladed servers 101a-101n. This virtual I/O architecture provides an I/O channel that works with any Fibre Channel-based storage system. In a clustered environment, this virtual I/O feature enables functionality in the PAN management software for creating logical connections that can be shared among clustered virtual servers, and for high speed mapping of these connections to failover bladed servers.

The PAN management software provides provisioning functionality allowing administrators to network virtual servers without configuring the hardware and other physical resources. The basic components of the network of virtual servers are virtual Ethernet interfaces and virtual switches. A virtual Ethernet interface implements all the functionality of a physical network interface card for a virtual server and a virtual switch implements all the functionality of a physical switch for a virtual server. These virtual components provide communication channels to other virtual servers and to external networks that are secure, private, and redundant.

The PAN management software contains functionality permitting administrators to configure virtual Ethernet interfaces that are similar to the way physical network interfaces are configured. Using the PAN management software, an administrator can create multiple virtual Ethernet interfaces on a single virtual server, add and reconfigure virtual Ethernet interfaces on executing virtual servers without rebooting, and place a virtual server in a network without stopping any services executing on that virtual server.

The PAN management software also contains functionality allowing an administrator to configure virtual server connections by assigning a virtual Ethernet interface of a virtual server to a virtual switch. The PAN management software creates and manages the connections once the assignment is made. A virtual server connected to a virtual switch and a virtual Ethernet interface follows the same connectivity and availability rules as a conventional server connected to a conventional switch through a convention Ethernet interface. The virtual switches are designed to never run out of ports. Through the PAN management software, an administrator can add or remove assignments of virtual Ethernet interfaces to virtual switches without reconfiguring the virtual switches or rebooting the affected virtual servers.

The architecture of the PAN bladed system 100 allows administrators to create logical processing area networks ("LPANs"). An LPAN includes virtual servers and other virtualized network and storage components that are logically separated from resources not included in the LPAN. While the majority of the resources in an LPAN are used exclusively within an LPAN, some resources, e.g., virtual switches and failover bladed servers, may be shared by virtual servers in other LPANs.

The PAN management software includes functionality permitting virtual servers to be dynamically moved among LPANS, clusters and services. In addition, the PAN management software provides system monitoring functionality allowing an administrator to monitor the processing requirements of applications and to reallocate processing capacity while the bladed system 100 is running. The PAN management software also includes functionality that can be configured to reallocate processing capacity automatically at specific times based on historical usage patterns.

The architecture of the PAN bladed system 100 is designed for high availability computing. The combination of the system design and failover functionality implemented in the PAN management software provides both automatic hardware failover and automatic application failover. This architecture provides for N+1 failover, i.e., a single bladed server can be designated as the failover target for any and/or all other bladed servers in the bladed system 100. The PAN management software includes a failover framework for specifying and managing failover policies and for monitoring the system for hardware and application failures. The failover framework includes functionality allowing an administrator to designate a specific failover bladed server or a pool of failover bladed servers for each virtual server. Two types of pools are supported: a global pool in which the designated failover bladed servers are available as failover targets for all bladed servers in the system; and a local pool in which the designated failover bladed servers are exclusively available to one LPAN. This pooling capability allows administrators flexibility in matching failover requirements with processing resources. For example, an administrator can create a local pool of two failover bladed servers to provide failover for five virtual servers in an LPAN, rather than assign a failover bladed server to each virtual server.

When the PAN management software determines that a virtual server has failed due to failure of a bladed server assigned to that virtual server, the PAN management software automatically remaps all disk, networking and switch connections assigned to the virtual server to a failover bladed server designated for that virtual server. The failover bladed server is then booted. During the boot process, the virtual server and the application(s) that were executing on that virtual server are restarted.

The failover framework contains additional functionality to manage application failover in a manner similar to bladed server failover. This additional functionality allows an administrator to define a set of highly available application services and to place these services under start/stop control of the PAN management software. The failover framework causes application health monitoring software to be executed on the bladed servers assigned to each of the virtual servers running applications designated as requiring high availability. This application health monitoring software notifies the failover framework if the application it is monitoring fails. When the failover framework determines that a monitored application has failed, the framework shuts down the virtual server and the bladed server that was executing the failed application, remaps all disk, networking and switch connections assigned to the virtual server to a failover bladed server designated for the virtual server, and boots the failover bladed server. During the boot process, the virtual server and the application are restarted.

Figure 2A:
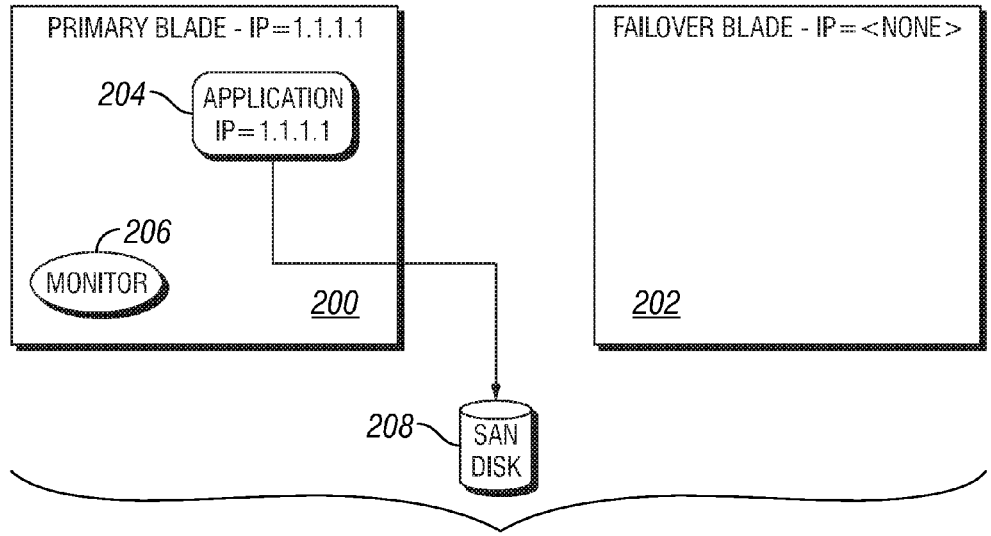
FIGS. 2A and 2B illustrate application failover in accordance with another embodiment of the present disclosure.
Figure 2B:
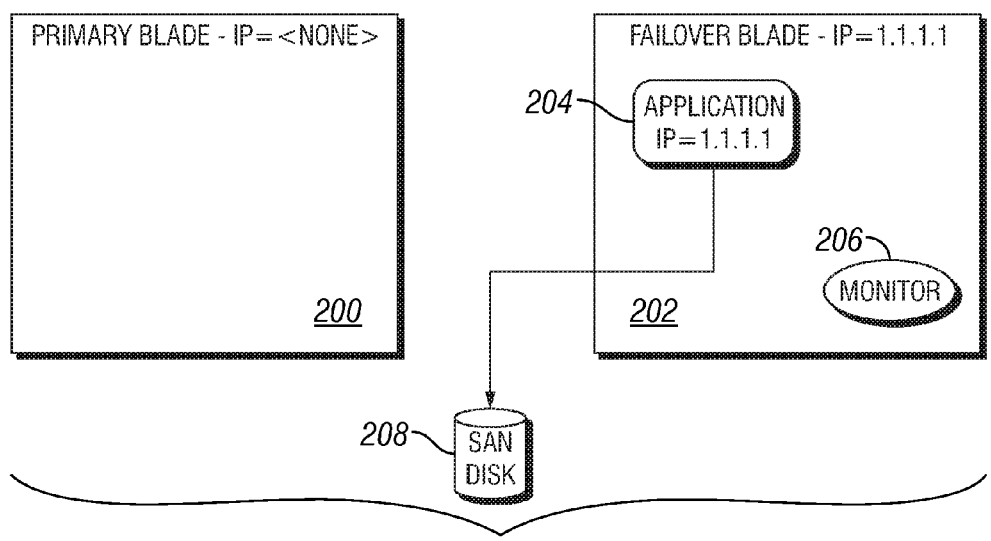

FIGS. 2A and 2B illustrate application failover on a bladed server with a PAN architecture in accordance with another embodiment. FIG. 2A illustrates the state of the system before an application fails and FIG. 2B illustrates the system after application failover is performed. In FIG. 2A, an application 204 is executing on a virtual server that comprises a bladed server 200, a disk 208 in a storage area network, and a network connection with the IP address 1.1.1.1. The disk 208 contains the installed executable code of the application 204, boot scripts, and any state data maintained as the application executes. The application 204 has been designated as a highly available application so application health monitoring software 206 is executing on bladed server 200 to monitor the state of the application 204. The application health monitoring software 206 will notify the PAN management software if the application fails in order to initiate the application failover process. Bladed server 202 has been designated as the failover blade for the virtual server executing on bladed server 200. Bladed server 202 is idle and has no disk or network resources assigned to it.

In FIG. 2B, the application 204 has been failed over to bladed server 202. Bladed server 200 has been shut down and the disk 208 and the IP address originally configured with process blade 200 are now configured with bladed server 202. The bladed server 202 has been booted using the boot sequence stored on the disk 208 and the application 204 has been restarted during the boot sequence. The application 204 is executing on bladed server 202 with the identical storage and network resources it was using prior to failing on bladed server 200. In addition, the application health monitoring software 206 has been moved to bladed server 202 and continues to monitor the state of the application.

While several embodiments have been provided in the present disclosure, it should be understood that the present disclosure may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by on skilled in the art and could be made without departing from the spirit and scope disclosed herein.

What is claimed is:

1. A bladed system, comprising:
a plurality of bladed servers;
a storage device sharable by the plurality of bladed servers;
software stored on the storage device;
a first bladed server of the plurality of bladed servers to execute the software on the storage device; and
a component distinct from the plurality of bladed servers that monitors execution of the software on the storage device by the first bladed server of the plurality of bladed servers, wherein the component promotes execution of the software on the storage device by a second bladed server of the plurality of bladed servers in response to detecting failure of the software on the first bladed server,
wherein the second bladed server is idle prior to the component detecting the failure, and wherein the second bladed server is selected from a pool of designated failover blades subsequent to the component detecting the failure.

2. The bladed system of claim 1, wherein the software is further defined as an operating system.

3. The bladed system of claim 1, wherein the software is further defined as an application.

4. The bladed system of claim 1, wherein the software is further defined as an operating system and an application operable on the operating system.

5. The system of claim 1, further comprising a server control and wherein the component is a software component operable by the server control.

6. The system of claim 1, wherein the component further shuts down the first bladed server, boots the second bladed server, and assigns network and storage resources assigned to the first bladed server to the second bladed server.

7. The system of claim 6, wherein the component is further defined as management software.

8. The system of claim 7, wherein the component includes application health monitoring software that executes on the first bladed server and notifies the management software if the application fails.

9. The system of claim 1, wherein the storage comprises a storage area network.

10. The system of claim 1, wherein the storage comprises network-attached storage.

11. A method for automated application failover on a bladed server comprising:
providing a plurality of bladed servers;
storing an application on a storage device accessible by at least some of the plurality of blades;
executing the application on the storage device by a first bladed server of the plurality of bladed servers;
monitoring the application during execution;
detecting failure of the application by a component distinct from the plurality of bladed servers; and
in response to detecting the failure, executing the application on the storage device by a failover bladed server, wherein the failover bladed server is idle prior to detecting the failure, and wherein the failover bladed server is selected from a pool of designated failover blades subsequent to detecting the failure.

12. The method of claim 11, further comprising:
shutting down the first bladed server;
assigning disk resources and network resources assigned to the first processing blade to the failover bladed server; and
booting the failover bladed server.

13. The method of claim 11, further comprising:
designating a second bladed server of the plurality of bladed servers to be the failover bladed server.

14. The method of claim 11, wherein the storage device is further defined as a storage area network.

15. A system for managing application failover, comprising:
a plurality of bladed servers, including a first bladed server and a second failover bladed server;
a server control in communication with the plurality of bladed servers;
a storage device accessible by the plurality of bladed servers;
an application stored on the storage device;
the first bladed server executing the application on the storage device; and
an executable management component stored on the server control that monitors execution of the application on the storage device by the first bladed server, wherein the executable management component promotes execution of the application on the storage device by the second failover bladed server in response to detecting failure of the application on the first bladed server,
wherein the second failover bladed server is idle prior to the executable management component detecting the failure, and wherein the second failover bladed server is selected from a pool of designated failover blade servers subsequent to the executable management component detecting the failure.

16. The system of claim 15, wherein the executable management component further shuts down the first bladed server and boots the second failover bladed server.

17. The system of claim 15, wherein the executable management component monitors the first bladed server for failure.

18. The system of claim 15, wherein the executable management component monitors the application for failure.

19. The system of claim 15, wherein the executable management component monitors both the first bladed server and the application for failure.

20. The system of claim 15, wherein the storage device is further defined as an external storage device.

21. The system of claim 15, wherein the storage device is further defined as a storage area network.

* * * * *